April 2, 1929. P. M. SALERNI ET AL Re. 17,251

DISTILLATION APPARATUS

Original Filed July 16, 1924 3 Sheets-Sheet 1

Inventors
P. M. Salerni and
E. M. Salerni
by Cushman Bryant & Darby
Attorneys

April 2, 1929. P. M. SALERNI ET AL Re. 17,251

DISTILLATION APPARATUS

Original Filed July 16, 1924 3 Sheets-Sheet 2

DISTILLATION APPARATUS

Original Filed July 16, 1924 3 Sheets-Sheet 3

Inventors
P. M. Salerni and
E. M. Salerni
by Cushman Bryant & Darby
Attorneys

Reissued Apr. 2, 1929.

Re. 17,251

UNITED STATES PATENT OFFICE.

PIERO MARIANO SALERNI, OF CHARING CROSS, LONDON, ENGLAND, AND EDOARDO MICHELE SALERNI, OF PARIS, FRANCE, ASSIGNORS TO E. M. S. INDUSTRIAL PROCESSES LIMITED, OF LONDON, ENGLAND, A CORPORATION OF ENGLAND.

DISTILLATION APPARATUS.

Original No. 1,541,071, dated June 9, 1925, Serial No. 726,360, filed July 16, 1924, and in Great Britain May 15, 1923. Application for reissue filed April 20, 1927. Serial No. 185,305.

This invention relates to the distillation or treatment of carbonaceous and other materials, especially, though not exclusively, to so-called low or medium temperature distillation processes carried on within an externally or internally heated retort. One object of the present invention is to increase the surface exposed to the influence of the heating medium, or the cooling medium where such is used; to allow for expansion and contraction of the retort; to improve generally the construction and disposition of the retort chambers so that space is economized and the valuable volatile constituents yielded up at different temperatures may conveniently be collected separately and conducted to separate condensers; to increase the yield of the more valuable constituents and to provide an improved method of rendering the joints of the retort, etc., fluid tight.

According to one feature of the present invention the retorting apparatus may be constituted by a number of troughs or cylinders of suitable, and preferably uniform length which are located side by side, and which are so constructed or arranged that the material undergoing treatment therein passes or is fed laterally from trough to trough or from cylinder to cylinder. In the case of cylinders located side by side and heated externally the several cylinders may be in communication with each other throughout their entire length or they may be placed in communication with one another by boundary walls of a suitable height or by providing slots or recesses in the boundary walls which separate one cylinder from its contiguous cylinder. In the case of troughs the material is fed over the side of one trough into the contiguous trough. The several troughs may be closed in at their upper parts in any suitable manner; for example, a common roof, lid or cover for the several retorts of the series may be provided or the roof may be formed from a number of segmental roof sections. The troughs, instead of being placed side by side may be superimposed and the material fed, if desired with reversal of feed, from end to end of each superimposed retort or they may be placed end to end. The said troughs are preferably provided with stirring or agitating devices and the feed or lateral discharge of the material from one trough or cylinder to another may be controlled either by regulating the speed at which the stirring apparatus is rotated or by regulating the rate at which the material is fed into the first trough or cylinder of the series. The stirring or agitating apparatus may be of the kind which is so constructed that it serves primarily to stir or agitate the material without propelling the same through the retort. The propelling of material from trough to trough, as will be more fully explained hereinafter, is effected by the head of material fed into the first trough of the series so that the rate of feed of the carbonaceous material through the individual troughs is dependent upon the rate of feed of the material into the first trough. The several troughs or cylinders constituting the series may, if desired, be provided with corrugations as aforesaid so as also to increase the heating surface or to allow for expansion or contraction or both, and they may also, as aforesaid, be provided externally or internally with ribs or fins.

By locating the troughs side by side and feeding the material forward from trough to trough in the longitudinal direction of the series, expansion in the longitudinal direction of the series of retorts is provided for while, by providing each retort with transverse corrugations, expansion in the transverse direction is provided for, the heating surface being also increased and a more compact and efficient apparatus produced.

According to one feature of the present invention the surface exposed to the action of the heating medium is increased by undulating, corrugating or deforming the surface of the retort chamber. The corrugations, deformations or the like may be of any suitable cross section and in the case of corrugations may be disposed longitudinally in planes parallel to the axis of the retort. Preferably, however, they are formed transversely and at right angles to the axis of the retort, so as not only to increase the surface exposed to the influence of the heating gases but also to allow for expansion and contraction of the retort in the longitudinal direction. The corrugations or the like may be formed throughout the entire length of the retort or they may be provided at suitable distances apart throughout its length. In cases where a retort is provided with a mixing device or a device for feeding the material from end to end of the retort, the arms of the mixer or equivalent device extend into the corrugations so as to scrape and clear away any carbonaceous material which tends to adhere to the corrugated interior surface of the retort and so as to prevent any substantial sagging of the shaft by acting as a sort of support or brace. The body of the retort may be constituted by metal, or by brickwork or other refractory material, or of a combination of metal and brickwork. In the case of refractory material such as brickwork the heating gases pass through passages located behind the corrugated brickwork or behind a corrugated lining therefor. In the case of a retort which is heated externally and in order further to increase the transmission of heat from the furnace to the retort, the part thereof which is located above the furnace may be provided externally or internally or both internally and externally with projecting ribs or fins which become highly heated by the furnace gases or the hot material. The fins may be of somewhat similar construction to those used for cooling purposes in the cylinders of internal combustion engines.

The shaft of the stirring or agitating device may also be so constructed as to allow for expansion and contraction. For example, the shaft may be constructed in two or more parts which are concentrically mounted so that one part can slide relatively to the other, or else the ends of the shaft may be mounted within bearings or supports which allow of longitudinal expansion of the shaft relatively thereto.

According to another feature of the said invention and in order further to assist in driving the material which is to undergo distillation and at the same time to provide an auxiliary storage compartment for the said material, a roof or canopy having inclined sides may be positioned above a central gangway extending between two banks of retorts, and supported on walls or partitions at the inner ends of the retorts. Disposed above the said roof or canopy and at suitable distance therefrom may be an outer roof having inclined sides, and supported on walls located at the outer ends of the retorts. An opening or openings may be provided in the outer roof through which the material which is to be distilled can be fed so as to fill up the space between the inner and outer canopies and between the outer partition walls and the retorts, or the dryers when such are provided. The inclined sides of the inner canopy can be so disposed relatively to the drying apparatus or the retorts that the material can be fed therein by gravity. The material can be raised by means of an elevator and discharged on to one or more endless conveyor bands running along or above the apex of the outer roof or canopy and discharged therefrom to various points of the said storage compartment. If desired, the material before being fed into the hoppers of the elevator can be passed through a crusher. In cases where the main supply of material which is to undergo treatment is located adjacent to the distillation plant a chamber can be formed beneath the material and doors or discharge hoppers provided in the roof of the said chamber so that any desired quantity from the main body of material can be allowed to fall by gravity onto an endless band conveyor and thereafter fed either to the aforesaid crusher or directly to the elevator which carries it to the auxiliary storage compartment or to various points thereof by the aforesaid band conveyor.

In order that the said invention may be clearly understood and readily carried into effect the same will now be described more fully with reference to the accompanying drawing, in which:—

Figure 1 is a diagrammatic view showing the lay-out part of a plant constructed according to one form of the present invention, and Figure 2 a transverse section thereof.

In this lay-out eight banks of retorts are shown disposed on each side of a central gangway, each bank being composed of two superimposed sets of retorts, each set comprising eight retorts located side by side.

Figure 5 is a longitudinal section and

Figure 6 is a transverse section of the retorts which comprise each set.

Figure 7 is a longitudinal sectional view of the casing showing three sets of superimposed retorts therein.

Figure 1:
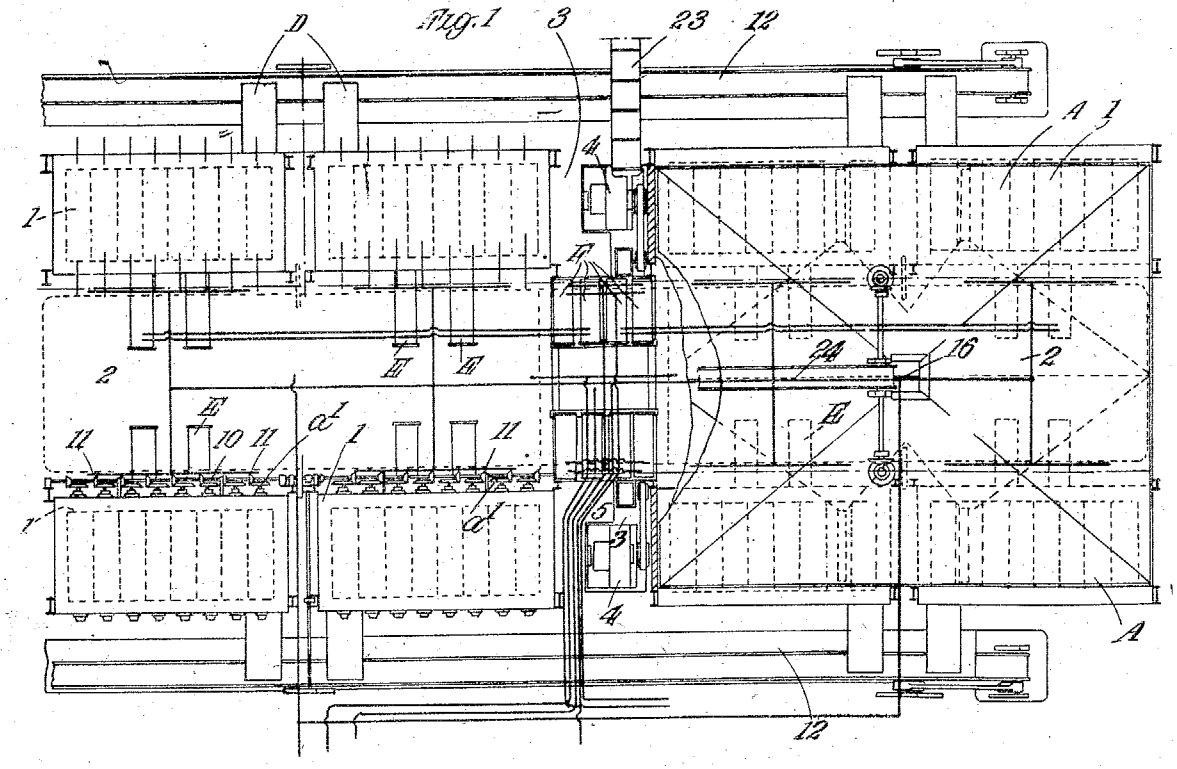
Figure 2:
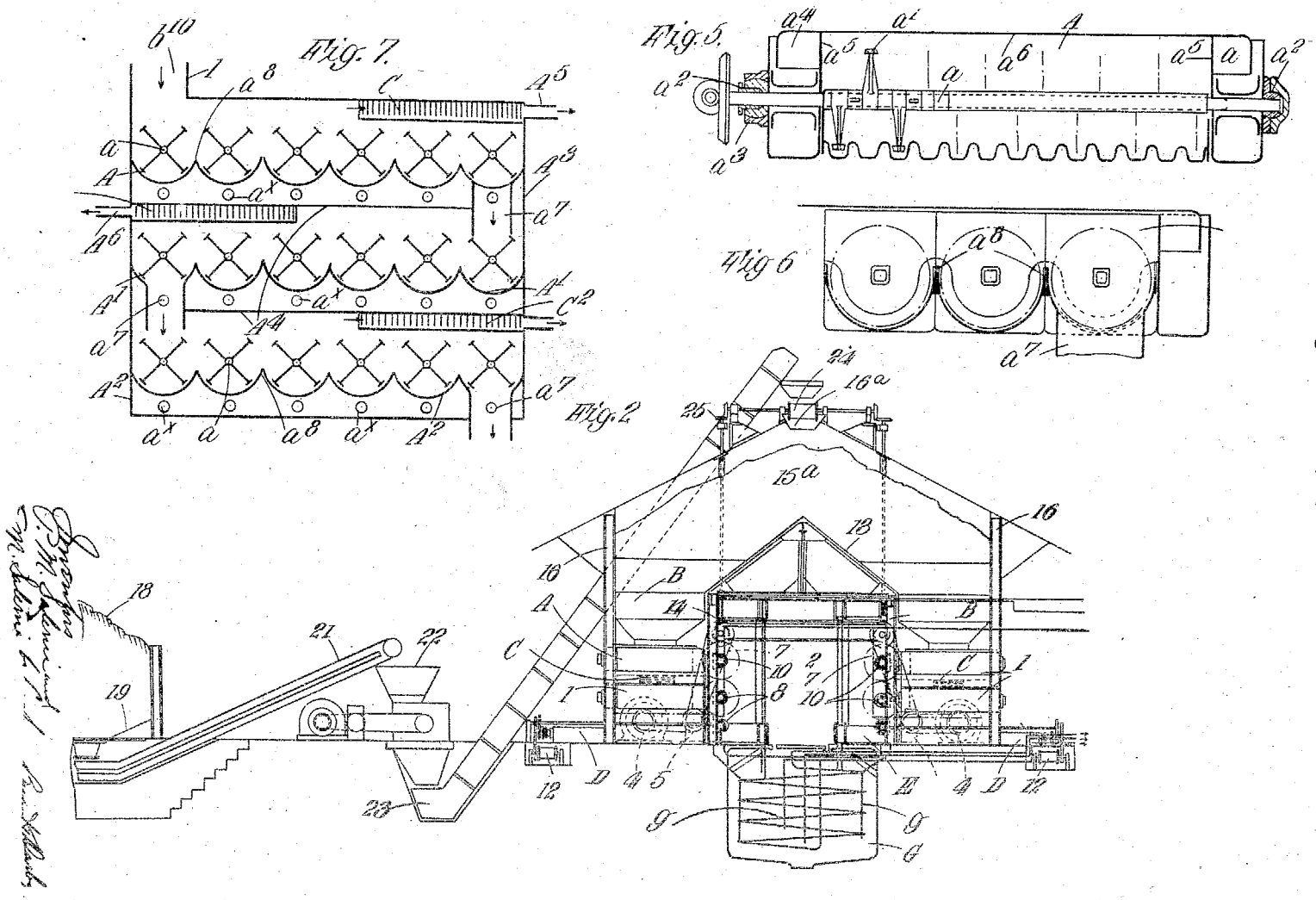
Figure 3:
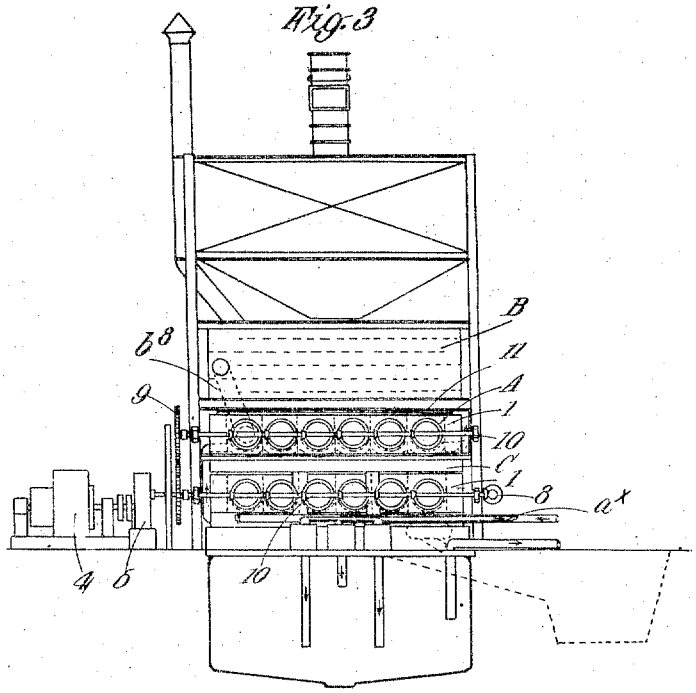
Figures 3 and 4 are a longitudinal section and a plan view respectively of a smaller installation comprising two banks of retorts arranged on either side of a central gangway each bank being composed of two sets of superimposed retorts and each set comprising six retorts.
Figure 4:
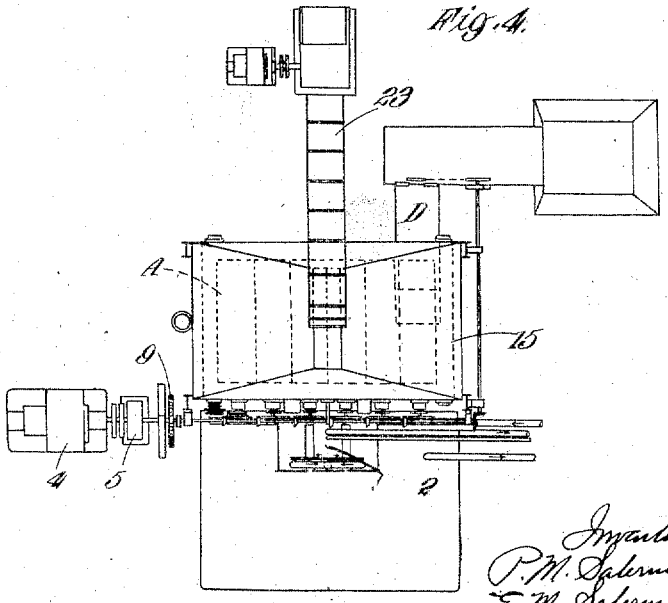

1, 1 are the superimposed banks or retorts, which, with the object of reducing the overall space occupied by a plant embodying the aforesaid features in combination, are arranged on either side of a main gangway 2; gangways 3, 3 (Figure 1) at right angles to the main gangway are also provided. The driving apparatus may conveniently be constituted by electromotors 4, 4 adapted through change speed gearing 5, 5 to drive shafts which (Figures 1 and 2) through driving belts 7 and gearing 8 or through gear wheels 9 (Figures 3 and 4) (provided if desired with clutch devices), drive the main shafts 10, 10 of the several retorts A, A the shaft being provided with bevel wheels 11, 11 which engage bevel wheels $a'$, $a'$ on the end of the shafts $a$, $a$ of each retort. Through driving belts or gearing the driving mechanism of the preliminary dryers B, B dust extractors C, C coke coolers D, D condensers E, E and F, F etc., are also driven. The preliminary dryers B, B are disposed above each bank of retorts A, A and the dust extractors C, C are located between each superimposed set of retorts A, A. The vapours yielded up during distillation are withdrawn from one end of each retort A, A into impact condensers E, E the said condensers E, E being located in the gangway 2. The oil, after leaving the condensers E, E may be passed through water condensers F, F of any convenient type, and thereafter the oils may be conducted to a settling tank G disposed beneath the gangways 3, 3. Associated with the said settling tank are a number of depending tubes $g$, $g$ extending to different depths therein so that after the oils have settled in layers according to their specific gravity they may be withdrawn separately by means of centrifugal pumps for further treatment. The solid material which has undergone distillation within the retorts A, A is discharged from the retorts and passes through the coke coolers D, D. After being discharged from the coolers D, D the coke is received upon endless bands 12, 12 adapted to carry the coke away from the distillation plant. The said conveyor bands 12, 12 are preferably arranged as shown parallel to the gangway 2, 2. 13 is the roof or canopy having inclined sides which is positioned above the central gangway 2, the said canopy 13 being supported on walls or partitions 14 at the inner ends of the retorts. Disposed above said roof or canopy is the outer roof 15 supported on walls 16 located at the outer ends of the retorts. The said outer roof 15 is provided with opening $16^a$ through which the material to be distilled is fed so as to fill the space $15^a$ between the inner and outer canopies and between the partitions 16 and 14 and the tops of the dryers B, B. The main supply of fuel which is to undergo distillation is located at the point 18 where it is disposed above a floor 19 provided with one or more trap doors and discharge hoppers 20 so that by opening the said door or doors the material falls by gravity through the hopper 20, on to an endless band conveyor 21 disposed beneath the hopper 20 which raises and discharges the same into the crusher 22. The material discharged from the crusher 22 is fed on to a second conveyor 23 by which it is raised to a point above the outer roof 15 where it is discharged on to an endless band conveyor 24 which runs parallel to the central gangway 2 and which is adapted to discharge the material through the opening $16^a$ into the space $15^a$ between the inner and outer canopies. The said endless band conveyor 24 is driven in any suitable manner, for example and as shown at Figure 2 by bevel gearing 25 and driving shafts from the motors 4, 4. The retorts are heated, in the example shown, by gas and air burners $a^x$, $a^x$ (Figure 3), the gas being supplied from any suitable source, for example it may be constituted by the stripped gas derived from the distillation process.

In operation, fuel which is to undergo distillation within the retorts, A, A is withdrawn from the main storage 18 discharged through the trap door 20 on to the conveyor 21 and transported to the crusher 22. The crushed material is delivered to the conveyor 23 by which it is raised above the roof of the outer canopy 15, and discharged on to the band conveyor 24 by which it is conveyed to the opening $16^a$, where it is delivered into the auxiliary storage chamber $15^a$ located between the inner and outer canopies 13 and 15. From the auxiliary storage chamber $15^a$ within which the material undergoes partial drying; it passes by gravity into the dryers B, B and from thence to the upper set of retorts A, A. After leaving the retorts A, A the solid material passes into the lower set of retorts and thereafter enters the coke coolers D, D. From thence the cooled coke is discharged on to the conveyor bands 12, 12 and conveyed, for example, to a briquetting machine. The gases yielded up during distillation enter the dust extractor or extractors C, C located between each set of retorts and thereafter enter the impact condensers E, E and through mains are conveyed to the water condensers F, F the condensed oils being discharged into the settling tank G, from which they are withdrawn at different levels for further treatment. As the retorts, dryers, etc., are disposed on each side of the main gangway 2, 2 and as the driving mechanism for the plant is located within the lateral gangway 3, 3 the valves, indicators, controls, etc., for the entire plant can also be positioned at the centre of the structure, thus enabling the entire plant to be supervised and controlled from a central station with the minimum number of operators.

On leaving the dryer B, B the material passes into the first retort A of the series, these retorts, as shown in detail at Figures 5 and 6, comprising a cylindrical casing having a corrugated base to increase the surface exposed to the action of the heating gases, the gas and air burners or other devices employed for heating the retort being located beneath the retort bottom. Extending longitudinally of the retort is a shaft $a$ carrying radial arms $a^1$ disposed at suitable intervals apart, the distance apart of each of these arms in the example shown corresponding to the distance between the successive corrugations in the bottom of the retort.

Owing to this arrangement, and when the shaft is rotated the scrapers first plow or dig into the bed of material, then extend into the corrugated portions of the retort and scrape and remove any material which may tend to adhere thereto and finally carry up the particles of material which have been in contact with the heated surface of the trough into the bed of material. The aforesaid action of the arms and associated scrapers tends to raise some hot dust above the bed of material. This hot dust, as noted hereinbefore, is separated in a hot condition from the gases yielded up during distillation by the dust extractors C, C. By this arrangement dust cannot be carried along with the volatile distillates and deposited with condensate in colder parts of the apparatus. Due to the aforesaid instrumentalities and operation thereof, the following effect is achieved, to wit:—the individual troughs remain full of coal or other carbonaceous material with only a small portion thereof in actual contact with a heated surface for a short period of time. If the coal were allowed to stay in contact with the heated surface for a considerable period of time, tar, oils, etc. would exude from the coal particles and thus tend to cause conglomeration of the coal into masses. The arms and associated scrapers, however, acting to plow into and through the mass in each trough prevents any sticking of the particles to the surface of the trough and any general agglomeration of the particles to each other. At the same time, the stirrers remove the coal particles in contact with the heated surface from said surface to the interior of the bed of coal in the trough and allow other coal particles to come into direct contact with the heated surface. The previously heated particles which are moved back into the bed of material distribute their heat to neighboring particles in the bed and, while in the bed, allows the heat present in their surface layers to penetrate to the core of each particle. The stirrers, as mentioned hereinabove, do not act primarily as shovels to scoop the material from one trough to the next one, but allow the material to remain in each trough and not to leave it until it has received its treatment, the material being moved from trough to trough by and at the same rate as the incoming feed. By permitting the particles to remain in each individual trough in order that the material gets its proper treatment, all of the particles of each trough are subjected to the same treatment for a controlled period, i. e. the full value of all of the treatment the particles can get in each trough is given to the particles before they leave the trough. The arrangement is such that the particles cannot be over-treated or harmed even if the particles stay for a short or long period. At the ends of the shaft are spherical end members $a^2$, $a^2$ located within correspondingly shaped spherical bearings $a^3$, $a^3$, a gland or other suitable packing means being also provided. Owing to this arrangement a limited amount of movement of the shaft relatively to its supporting bearing $a^3$, $a^3$ is permitted. Each retort is provided at its ends with a chamber $A^4$ into which extensions of the detachable roof $a^6$ project. Baffle plates $a^5$, $a^5$ are provided so that the chamber acts to seal off the retorts from the atmosphere. The successive retorts as shown at Figure 6 are disposed side by side and are separated from one another by partition plates $a^8$, $a^8$. Owing to this arrangement and when the material is fed into the first retort of the series it undergoes treatment therein and as the retort fills the excess material passes laterally over the partition plate $a^8$ into the next retort of the series. There it undergoes further treatment, at a higher temperature if desired, and passes into the next retort where it is subjected to further treatment, if desired at a still higher temperature. After passing through the upper set of retorts, the material falls through the opening $a^7$ into the first retort of the similar set of retorts situated immediately beneath, where the material undergoes further heat treatment, the successive retorts of the lower series being subjected to higher temperatures than those immediately above so as to distil off the oils which volatilize at higher temperatures than those in the retorts immediately above.

In the form of the invention illustrated in Figure 7, three sets or rows of superimposed retorts or troughs are shown. These retorts are located within an outer casing $A^3$ provided with an inlet $b^{10}$ leading from the preliminary dryer B to the first retort A of the series. The material on entering the retort A is stirred and agitated and fed laterally over the side wall $a^8$ of the first trough into the next trough of the series; thereafter the material passes from trough to trough as indicated by the arrows until it reaches the exit opening $a^7$, whereupon it falls into the first trough of the series located immediately beneath. The material is then fed with reversal of feed as indicated by the arrows through the other series of troughs until it reaches the end trough, whereupon it falls through an opening $a^7$ into the first trough of the third set of troughs, The material is again fed laterally with reversal of feed from trough to trough of the third series until it reaches the opening $a^7$ leading to the coke coolers $d$, $d$. Each retort is heated by gas and air burners $a^x$, $a^x$ and the several retorts are separated from one another by division plates $A^4$ so that the volatile products in each set of troughs can be drawn off separately through openings $A^5$, $A^6$ and $A^7$ leading from the dust extractors C, $C^1$ and $C^2$ to the impact condensers.

An arrangement of this kind has the advantage that the material is thoroughly dried and any water present therein is driven off in the form of steam in the first one or two troughs of the series, while in the remaining troughs of the series the hydrocarbon oils are distilled and may be withdrawn at approximately the temperatures at which they are yielded up by the carbonaceous material. Cracking of the hydrocarbons into permanent gases and heavy oils is thereby avoided and the yield of lighter and more valuable oils is increased. The volatile constituents yielded up within each separate trough or cylinder of the series may be drawn off and condensed separately, and by permitting several sets of retorts to be superimposed or located side by side, as shown at Figures 1–4, space is economized and the mechanism for actuating the stirring devices can be simplified.

Instead, however, of causing the material to be discharged laterally from one trough to the next of the series the material may undergo independent or separate treatment in each trough and be discharged at the end thereof or removed therefrom in any suitable manner. In such cases each trough is preferably provided with a device of the character described in English Patent No. 182,601 which serves to agitate the material without feeding the same or only feeding the same to an incidental extent and at a slow rate of speed. A large volume of material can thus be treated separately in the several retorts of the series.

The material which is to undergo treatment may, if desired, be fed into a gastight chamber formed by transversely disposed partition plates or dividing walls which extend to the roof of the retort and which divide off a section of the trough from the main portion thereof. The shaft carrying the aforesaid rotatable arms *a* may extend through the said chamber and the partition plates may be formed at their lower ends with cutaway portions through which the material which enters the chamber is fed or pushed in the longitudinal direction of the retort by the aforesaid rotating plates so that it enters the main portion of the trough located on either side of the said dividing wall.

Owing to this arrangement the chamber is hermetically sealed and any escape of the evolved vapours or gases is prevented. A similar arrangement of partition plates may be employed at any other desired parts of the apparatus.

Apparatus constructed as aforesaid may also be employed on a small scale for laboratory use. In such cases and in order to secure the maximum yield of oil and at the same time to render it feasible to separate the vapours and gases given off during the early stages of the distillation process from the oils given off at later stages, the series of troughs may be divided off from one another by partition walls into a number of independent sections. To this end partition plates may be provided between two or more troughs which extend to the enclosing roof and which are provided at one end with an opening through which the solid material can pass from one trough to the next of the series into a sealing chamber provided with a baffle plate having an opening at its lower end only thus preventing the escape of the gases and vapours. The dividing walls between the other troughs of the series may also be provided with openings at their upper parts, for the lateral escape of the material undergoing treatment, said openings being staggered or displaced relatively to one another so as to cause the material to pass from one trough to another of the series at different points throughout the length thereof. By dividing off the retort into several sections as aforesaid not only can the steam and other vapours be drawn off separately but the volatile hydrocarbons yielded up at different temperatures during the distillation process can be drawn off and condensed either separately or collectively. The size of the condenser is thereby materially reduced as the large volume of steam, etc., given off during the early stages of the process does not require to be passed with the oil vapours into the condensers.

It will be obvious that the aforesaid apparatus is applicable not only for effecting the distillation of carbonaceous materials but also for drying or cooling purposes. In cases where the entire apparatus or any section thereof is used for drying purposes, for example when peat is being treated, combustion or other gases may be passed through the apparatus or through any special section thereof, or the apparatus may be heated (or cooled) externally or it may be heated (or cooled) both externally and internally. In cases where peat or the like is being treated the first tier or tiers of troughs of the series may be used for evaporating the moisture contained in the peat or the like and the lower tiers for subjecting the dried peat or the like to the requisite distillation process. The improvements above referred to are also applicable to retorts of the type in which the material is stirred by stirrers or is fed by means of a screw or otherwise from end to end of the retort without being allowed to escape laterally from one trough to the other. In such cases, where the feed and discharge of material takes place in the longitudinal direction of the retort, a number of superimposed tiers of retorts can also be provided, the material being fed as before described from the upper trough to the trough immediately beneath it through pipes or conduits into sealing chambers formed by plates which extend from the roof of the retort to the bottom thereof and in which a cutaway portion is provided for allowing the material to pass without escape of gas or the like into the interior of the trough.

Fluid tight joints may be provided where necessary throughout the apparatus by means of stuffing boxes in which the medium which prevents ingress or egress of the fluid is composed of a material having a low melting point such as lead or by a plastic material such as clay, or by means of a heavy oil or a pulverulent or granular material such as sand, coal dust or coke breeze. For example, a gas-tight joint may be formed between the roof or cover of the retorts and the body portion, by providing a channel along the top portion which is filled with one or other of the aforesaid mediums and into which a turned down flange on the roof or top of the retort is adapted to be inserted. In the case of a medium such as lead the material is poured in while molten, but when the retorts or other portions of the apparatus are in use the medium is adapted to melt at the temperature attained during normal working, thus forming a liquid seal. In the case of sand, powdered coal, coke breeze or the like it has been found in practice that although these materials may allow a small portion of the matter to escape when first used it rapidly becomes water-tight. Use may also be made in connection with the retorts of a medium having a low melting point such as lead, or a medium which will itself volatilize below the temperature at which the oils which are being distilled from the material undergoing treatment within the retorts are liable to be cracked.

What we claim and desire to secure by Letters Patent of the United States is:—

1. An apparatus for the distillation of carbonaceous materials with by-product recovery, comprising a casing having inlet and outlet openings; a series of horizontally elongated trough-shaped, open-topped retorts, curved in transverse cross sections, arranged parallel and contiguous to each other in substantially the same horizontal plane within said casing and adapted to receive sufficient solid material through the inlet opening to fill each retort, said inlet and outlet openings of said casing being adjacent opposite ends of the series of retorts respectively; means individual to each of said retorts for agitating solid material therein comprising a shaft parallel to the retort, a plurality of arms on said shaft, spaced from each other in the direction of the length of the shaft and extending radially in various directions from said shaft, said shaft being mounted for rotation on an axis parallel to the retort so that the paths of rotation of the outer ends of said arms are contiguous to the curved inner surface of the retort for a substantial part of the rotation of the shaft, whereby a body of solid carbonaceous material may be maintained in each of the retorts under repeated agitation by the means aforesaid before said material passes to a contiguous retort, means for heating material within the retorts, and a conduit connected with said casing for taking off gas and vapor therefrom.

2. An apparatus for the distillation of carbonaceous materials with by-product recovery, comprising a casing having inlet and outlet openings; a series of horizontally elongated trough-shaped, open-topped retorts, curved in transverse cross sections, arranged parallel and contiguous to each other in substantially the same horizontal plane within said casing and adapted to receive sufficient solid material through the inlet opening to fill each retort, said inlet and outlet openings of said casing being adjacent opposite ends of the series of retorts respectively; means individual to each of said retorts for agitating solid material therein comprising a shaft parallel to the retort, a plurality of arms on said shaft, spaced from each other in the direction of the length of the shaft and extending radially in various directions from said shaft, said shaft being mounted for rotation on an axis parallel to the retort so that the paths of rotation of the outer ends of said arms are contiguous to the curved inner surface of the retort for a substantial part of the rotation of the shaft, whereby a body of solid carbonaceous material may be maintained in each of the retorts under repeated agitation by the means aforesaid before said material passes to a contiguous retort, means for heating material within the retorts, a conduit connected with said casing for taking off gas and vapor therefrom, and a dust extractor communicating directly with said conduit and adapted to separate dust while hot from dust laden gas passing through said conduit.

3. An apparatus for the distillation of carbonaceous materials with by-product recovery, comprising a casing having inlet and outlet openings; a series of horizontally elongated trough-shaped, open-topped retorts, curved in transverse cross sections arranged parallel and contiguous to each other in substantially the same horizontal plane within said casing and adapted to receive sufficient solid material through the inlet opening to fill each retort, said inlet and outlet openings of said casing being adjacent opposite ends of the series of retorts respectively; means individual to each of said retorts for agitating solid material therein comprising a shaft parallel to the retort, a plurality of arms on said shaft, spaced from each other in the direction of the length of the shaft and extending radially in various directions from said shaft, said shaft being mounted for rotation on an axis parallel to the retort so that the paths of rotation of the outer ends of said arms are contiguous to the curved inner surface of the retort for a substantial part of the rotation of the shaft, whereby a body of solid carbonaceous material may be maintained in each of the retorts under repeated agitation by the means aforesaid before said material passes to a contiguous retort, means for progressively heating material within the retorts from a low temperature at the retorts adjacent to the inlet opening of the casing to a high temperature at the retorts adjacent to the outlet opening of the casing, and a conduit connected with said casing for taking off gas and vapor therefrom.

4. An apparatus for the distillation of carbonaceous material with by-product recovery, comprising a casing having inlet and outlet openings; a series of horizontally elongated trough-shaped, open-topped retorts, curved in transverse cross sections, arranged parallel and contiguous to each other in substantially the same horizontal plane within said casing and adapted to receive sufficient solid material through the inlet opening to fill each retort, said inlet and outlet openings of said casing being adjacent opposite ends of the series of retorts respectively; means for controlling the rate of feed of carbonaceous material through said inlet opening and thereby to control the rate of progression of the carbonaceous material through the series of retorts; means individual to each of said retorts for agitating solid material therein comprising a shaft parallel to the retort, a plurality of arms on said shaft, spaced from each other in the direction of the length of the shaft and extending radially in various directions from said shaft, said shaft being mounted for rotation on an axis parallel to the retort so that the paths of rotation of the outer ends of said arms are contiguous to the curved inner surface of the retort for a substantial part of the rotation of the shaft, whereby a body of solid carbonaceous material may be maintained in each of the retorts under repeated agitation by the means aforesaid before said material passes to a contiguous retort, means for heating material within the retorts, and a conduit connected with said casing for taking off gas and vapor therefrom.

5. An apparatus for the distillation of carbonaceous materials with by-product recovery, comprising in combination a drying chamber, means for introducing solid carbonaceous material into said chamber, means within said chamber for moving the carbonaceous material through said chamber at a controlled rate, means for heating carbonaceous material in said chamber to dry the material in its passage therethrough, a discharge passage from said chamber, a casing having inlet and outlet openings, the inlet opening being in communication with said discharge passage of the drying chamber; a series of horizontally elongated trough-shaped, open-topped retorts, curved in transverse cross sections, arranged parallel and contiguous to each other in substantially the same horizontal plane within said casing and adapted to receive sufficient solid material through the inlet opening to fill each retort, said inlet and outlet openings of said casing being adjacent opposite ends of the series of retorts respectively; means individual to each of said retorts for agitating solid material therein comprising a shaft parallel to the retort, a plurality of arms on said shaft, spaced from each other in the direction of the length of the shaft and extending radially in various directions from said shaft, said shaft being mounted for rotation on an axis parallel to the retort so that the paths of rotation of the outer ends of said arms are contiguous to the curved inner surface of the retort for a substantial part of the rotation of the shaft, whereby a body of solid carbonaceous material may be maintained in each of the retorts under repeated agitation by the means aforesaid before said material passes to a contiguous retort, means for heating material within the retorts, and a conduit connected with said casing for taking off gas and vapor therefrom.

6. An apparatus for the distillation of carbonaceous materials with by-product recovery, comprising in combination a drying chamber, means for introducing solid carbonaceous material into said chamber, means within said chamber for moving the carbonaceous material through said chamber at a controlled rate, means for heating carbonaceous material in said chamber to dry the material in its passage therethrough, a discharge passage from said chamber, a casing having inlet and outlet openings, the inlet opening being in communication with said discharge passage of the drying chamber; a series of horizontally elongated trough-shaped, open-topped retorts, curved in transverse cross sections, arranged parallel and contiguous to each other in substantially the same horizontal plane within said casing and adapted to receive sufficient solid material through the inlet opening to fill each retort, said inlet and outlet openings of said casing being adjacent opposite ends of the series of retorts respectively; means individual to each of said retorts for agitating solid material therein comprising a shaft parallel to the retort, a plurality of arms on said shaft, spaced from each other in the direction of the length of the shaft and extending radially in various directions from said shaft, said shaft being mounted for rotation on an axis parallel to the retort so that the paths of rotation of the outer ends of said arms are contiguous to the curved inner surface of the retort for a substantial part of the rotation of the shaft, whereby a body of solid material may be maintained in each of the retorts under repeated agitation by the means aforesaid before said material passes to a contiguous retort, means for leading gaseous heating medium into thermal relation first with the retorts adjacent to the outlet opening of the casing and then progressively with contiguous retorts in a direction toward the inlet opening of the casing and then into thermal relation with the drying chamber; and a conduit connected with said casing for taking off gas and vapor therefrom.

PIERO MARIANO SALERNI.
EDOARDO MICHELE SALERNI.